United States Patent [19]

Kurie et al.

[11] Patent Number: 4,540,362

[45] Date of Patent: Sep. 10, 1985

[54] FURNACE CURTAINS

[75] Inventors: John R. Kurie, Livingston; Mircea S. Stanescu, Pluckemin, both of N.J.

[73] Assignee: The BOC Group, Inc., Montvale, N.J.

[21] Appl. No.: 651,205

[22] Filed: Sep. 17, 1984

[51] Int. Cl.[3] .......................... F27D 7/00; A21B 1/00

[52] U.S. Cl. ....................................... 432/65; 219/405

[58] Field of Search .......................... 432/65; 219/405

[56] References Cited

U.S. PATENT DOCUMENTS 1,128,206 2/1915 Wiegand .............................. 432/65

*Primary Examiner*—John J. Camby

*Attorney, Agent, or Firm*—David L. Rae; Larry R. Cassett

[57] ABSTRACT

A plurality of cords of heat resistant material are disposed adjacent to one another in a plurality of layers. A heat resistant tape material having an adhesive formed thereon in a pair of beads is wrapped around the center portions of the cord members so as to form a pair of free hanging curtain sections effective to block gas flows in a heat treatment furnace or the like. The adhesive is also heat resistant, and the use of a tape to form this curtain assembly enables the same to be independent of mounting hardware such as clamped mounting plates. The vertical position of the curtain assembly may be adjustable so as to compensate for wear during use.

10 Claims, 4 Drawing Figures

FURNACE CURTAINS

BACKGROUND OF THE INVENTION

The present invention relates to curtain assemblies and more particularly to furnace curtain assemblies effective to substantially block gas flows in heat treating furnaces.

In many instances, such as in connection with the heat treating of ferrous parts, it is necessary to establish different gaseous atmospheres in separate zones of a heat treating furnace, or the like. For example, in the neutral hardening or annealing of such parts, different gaseous atmospheres are established in the preheat, hot and cooling zones of a furnace. An example of such a furnace zoning is found in British Patent Application No. 81-28392 and U.S. Pat. No. 4,294,395, the latter being directed to a process for brazing parts in a nitrogen based atmosphere and which is assigned to the assignee of the present invention. Typically, zoning of such furnaces is achieved by the use of sliding doors which are raised and lowered to enable the passage of parts being treated, but which are cumbersome and inefficient in furnaces through which parts are continuously passed as, for example, on a conveyor belt or the like. As the sliding doors of such furnaces are frequently opened and closed, it is difficult to maintain zones of separate gaseous atmospheres. The use of gas barriers such as inert gas flows or endothermic or exothermic gas flows has been proposed, but such gases tend to mix with a particular gaseous atmosphere in zones on either side of such "barrier".

It is also known to utilize relatively heavy but somewhat flexible curtains, typically at furnace entrances and exits to reduce the flow of ambient atmosphere into a furnace or the outward flow of furnace atmosphere adjacent to such inlet or outlet. One problem with the use of such curtains is that as the same pass over parts being translated through the furnace for heat treatment, etc., the curtains are deflected and expose considerable areas of the furnace of one zone to another zone and are thus relatively ineffective as gas barriers. If the weight of such curtains is increased to minimize such deflection, relatively light but large parts undergoing heat treatment, such as carburetor housings, etc., may be knocked over which in turn may lead to undesirable flows of brazing fluxes, etc. and the ineffective brazing of particular joints.

One solution to some of the foregoing problems is the use of curtains formed of a plurality of cords of heat resistant material. These curtains are formed by clamping mounting plates above and below a plurality of cords laid adjacent to one another and up to several layers deep. In this manner, a pair of curtain sections, each formed from many such cords, hang freely from the edge of the mounting plates. As parts are passed through a heat treating furnace, etc., in which such curtain assemblies are disposed, individual cord members will be deflected, but as only those cord members which contact the parts are deflected, a relatively effective barrier to gas flows between zones of the furnace is established. One problem with such curtains is that by clamping mounting plates directly onto cord members, the edges of the mounting plates, as well as the bolts securing such plates to one another, tend to wear and cut the cord members. In some instances, such cut cords fall on parts being heat treated which requires an operator to eventually remove such cords. In addition, the ends of cord members wear under furnace conditions which also mandates replacement thereof. Heat resistant cordage such as is sold under the trademark "Refrasil," is expensive and replacement of the same, as will be described below, is relatively time consuming and/or inconvenient. By employing mounting plates, as mentioned above, the curtain assembly cannot be readily replaced or stored independently of the mounting hardware. Thus, in order to replace a worn curtain assembly, the clamps securing the mounting assembly are released which results in a mass of cord members, which if acceptable for reuse, must be realigned in order to form a rebuilt curtain assembly. Alternately, spare curtain assemblies must be stored attached to or secured to the mounting hardware, and as the same may be anywhere between 18 inches to 8 feet in length, such storage or inventory of mounted curtain assemblies requires considerable space and is frequently impractical.

Thus, there is a clear need for furnace curtain assemblies which effectively block gas flows and yet are readily replaceable when worn but which are not excessively costly and may be easily stored when not in use.

OBJECTS OF THE INVENTION

It is an object of the present invention to provide improved curtain assemblies.

It is also an object of the present invention to provide curtain assemblies suitable for use in heat treating furnaces wherein curtain sections are independent of the mounting hardware required to support such curtain.

It is another object of the present invention to provide improved curtain assemblies comprised of cord material which are suitable for use in heat treating furnaces.

It is yet another object of the present invention to provide curtain assemblies which are effective to substantially block gas flows through such assemblies.

It is still another object of the invention to provide improved curtain assemblies suitable for use in heat treating furnaces and which are easily replaceable.

It is yet another object of the present invention to provide curtain assemblies which may be adjustably positioned in heat treating furnaces.

Other objects of the present invention will become apparent from the following description of exemplary embodiments thereof which follows and the novel features will be particularly pointed out in conjunction with the claims appended hereto.

SUMMARY

In accordance with the invention, a curtain assembly comprised of a plurality of heat resistant cord members or cordage is provided and includes elongated tape means for encircling the cordage about a position approximately centrally located along the length of the cord members to form a pair of free hanging curtain sections. Heat resistant adhesive material is applied to the cordage members and to the tape in such a manner as to secure the cordage and tape member so that the curtain assembly may be easily handled and stored independently of the mounting hardware such as clamping or mounting plates. Alternately, the tape member encircling the cordage may be sewn so as to secure the cordage to the tape member.

Preferaby, the curtain assemblies are formed by winding cordage on a frame or other suitable device, typically to a depth of two or more layers. The elongated tape means are affixed about the wound cordage in locations spaced from one another from the frame after which the cordage is cut to form curtain assemblies of the desired curtain length. The width of the curtain assemblies will correspond essentially to the width of the frame member and typically, for use in heat treating furnaces, widths of 18 inches to 8 feet may be employed.

The curtain assemblies so formed may be releasably secured to mounting hardware such as a pair of mounting or clamping plates disposed above and below tape members along the length thereof. Bolts or other suitable means are utilized to releasably secure the clamping members to the tape means which facilitate the retention of cord members cut by the bolts, etc. Thus, even though certain cord members may be cut by bolts, etc., the cord members will still be adhesively secured to the tape means, and the resulting curtain assembly will not be deficient in cordage when mounted in a heat treating furnace. In order to enable the proper adjustment of curtain assemblies in accordance with the invention, means are provided to dispose the same in any of a plurality of vertical locations in the furnace. This enables the curtain of a particular length to be lowered from the roof of a furnace when relatively flat parts are passed therethrough for heat treatment. Also, upon wearing of the free ends of the curtain assembly, the same may be lowered to enable gas flows under or through the curtain assembly to be substantially blocked and thus facilitate the preservation of different gaseous atmospheres in furnace zones defined by the curtain assembly.

BRIEF DESCRIPTION OF THE DRAWINGS

The invention will be more clearly understood by reference to the following description of exemplary embodiments thereof in conjunction with the following drawing in which:

FIG. 3 is a partial diagrammatic view of a curtain assembly mounted in a heat treating furnace or the like.

DESCRIPTION OF PREFERRED EMBODIMENT

Figure 1:
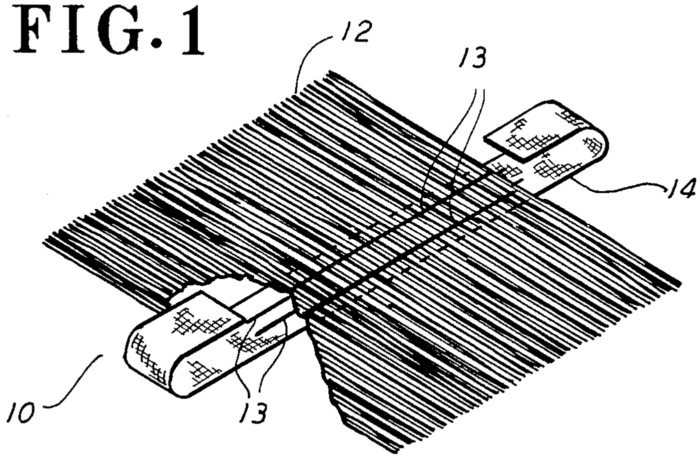
FIG. 1 is a partial isometric view of the curtain assembly according to the invention.
Figure 2:
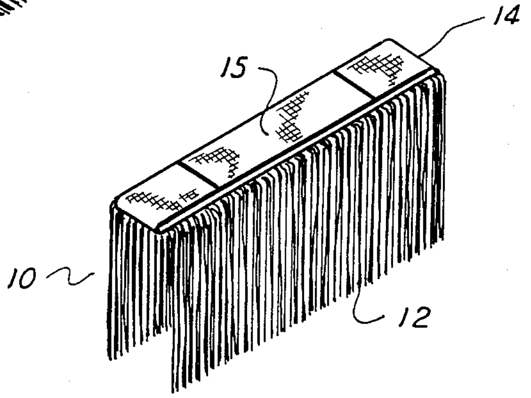
FIG. 2 is another partial isometric view of the curtain assembly according to the invention.
Figure 3:
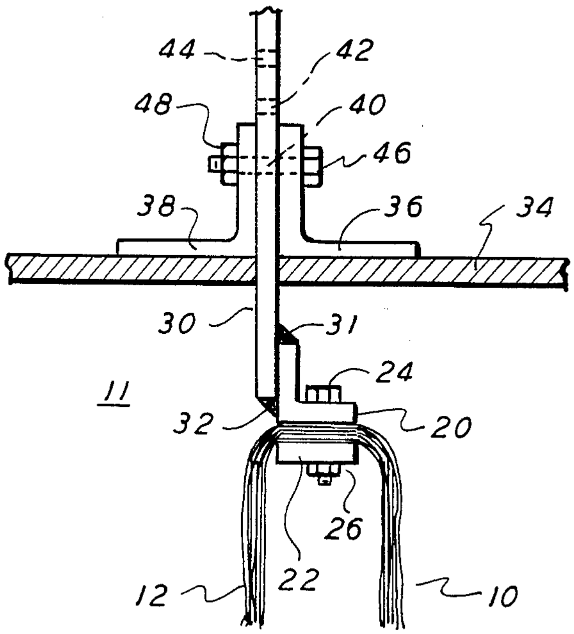
Figure 4:
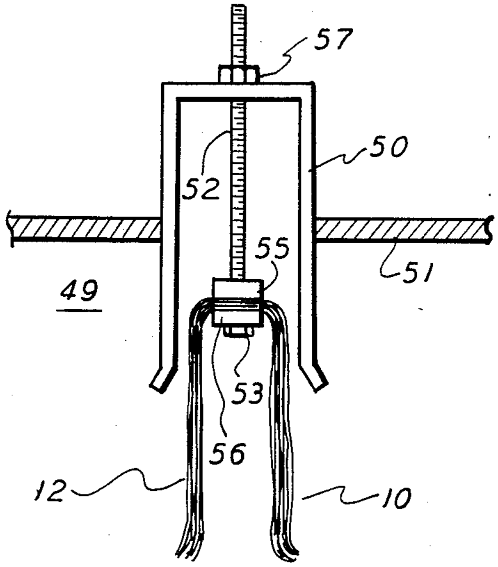
FIG. 4 is a further partial diagrammatic view of a curtain assembly according to the invention mounted in a channel disposed in the roof section of a furnace, etc.

Referring now to FIG. 1 of the drawing, illustrated therein is an exemplary embodiment of curtain assembly 10 according to the invention which is essentially comprised of cord members 12, beads of adhesive material 13, and tape member 14. Cord members 12 are preferably comprised of a silicone based heat resistant material such as is available commercially under the trademark "Refrasil." Cord members 12 may be set out on elongated tape member 14 adjacent to one another with a total width defined by cord members 12 defining the width of curtain assembly 10. The length of cord members 12 will define the height of the curtain which will equal approximately one-half the length of cord members 12 less the width of the elongate tape member 14. Preferably, each curtain assembly 10 will be comprised of a plurality of layers of cord members 12 and two to five layers will be suitable. In order to retain cord members 12 to one another and to elongate tape member 14, an adhesive material 13 is preferably deposited in a bead-like fashion which is depicted in FIG. 1. Adhesive material 13 is applied, again preferably in two beads, on each layer of cord members 12 prior to curing as will be subsequently described. Elongate tape member 14 is preferably longer than the width of curtain assembly 10 to enable the ends of member 14 to be folded over onto the upper layer of cord members 12 and into contact with the beads of adhesive material 13 thereon. As illustrated in FIG. 2, an additional piece of tape member 15, the length of which will substantially equal the distance between the ends of tape member 14, when folded over cord members 12, is affixed to beads of adhesive material 13 and the top layer of cord members 12. Alternately, tape members 14 and 15 may be sewn together with heat resistant thread to secure cord members 12 to tape members 14 and 15. The elongate tape member 14 of curtain assembly 10 is shown in FIG. 2 and may be clamped and heated to cure adhesive material 13 to effectively bond cord members 12 to one another and to elongate tape member 14. Curtain assembly 10 then will be formed and will be comprised of two free hanging curtain sections extending outwardly and downwardly from elongate tape members 14 and 15. It will be appreciated that by utilizing such tape members to retain cord members 12, the resulting curtain assembly 10 may be handled and stored independently of the mounting hardware, exemplary embodiments of which are illustrated in FIGS. 3 and 4 and which will be subsequently described. In addition, curtain assembly 10 may be easily handled as cord members 12 are secured to one another and to tape members 14 and 15 as mentioned above so that the problems of attempting to handle and store many individual lengths of cord material are simply averted by the present invention.

Referring now to FIG. 3, illustrated therein is a roof portion 34 of heat treating furnace 11, to which is mounted curtain assembly 10. A pair of mounting plates 20 and 22 are preferably disposed above and below curtain assembly 10, respectively, and are secured to one another by means of bolts 24. A plurality of such bolts may be utilized along the length of mounting plates 20 and 22 which length is substantially coextensive with the width of curtain assembly 10. It will be appreciated that stresses generated by bolts 24 and plates 20 and 22, as the same pass through and retain curtain assembly 10, are absorbed by elongate tape members 14 and 15 (FIG. 2) which results in less stress imposed upon cord members 12. Similarly, as a consequence of adhesively securing cord members 12 to tape members 14 and 15, as described above, the tendency of bolts 24 and the edges of mounting plates 20 and 22 to cut individual cord members 12 is significantly reduced. This in turn results in less selvage of cord members falling onto parts undergoing heat treatment and thus does not impair full heat treating of such parts while enabling curtain assembly 10 to last longer in service.

Mounting plates 20 may be affixed by weldments 31 and 32 or other suitable means to support member 30, which may take the form of a plate disposed vertically through an appropriately formed slot in roof 34 of furnace 11. Support member 30 is provided with a plurality of apertures defined therein as illustrated by apertures 40, 42 and 44. Brackets 36 and 38 may be rigidly affixed along the bottom surfaces thereof to the top of roof portion 34 or other suitable surface above furnace 11, and such brackets are spaced from one another by a distance substantially equal to the thickness of support member 30. A bolt 46 and nut 48 may be utilized to releasably secure support member 30 to brackets 36 and 38. It will be understood that depending upon the aperture 40, 42, 44, etc. utilized to receive bolt 46, the height of curtain assembly 10 in furnace 11 will be adjusted accordingly. Preferably, the fit of member 30 between bracket members 36 and 38 is substantially gas tight so that any leakage above curtain assembly 10 is minimized. By enabling the vertical position of curtain assembly 10 to be adjusted as mentioned above, further use may be made of this assembly as the ends of cord members 12 wear away from repeated contact with parts undergoing heat treatment.

Referring now to FIG. 4, illustrated therein in a further exemplary embodiment of the present invention wherein a curtain assembly 10 is mounted in a channel 50 welded to top 51 of a box 49 disposed adjacent to the entrance and/or exit of furnace 11 (not shown). Typically, channel 50 is generally inverted and U-shaped and is provided with a bolt 52 extending downwardly therethrough. Clamping plates 55 and 56 are supported on head 53 of bolt 52 as the latter will extend through plates 55 and 56. A nut 57 is provided with bolt 52 on top of channel 50 so that by adjusting the position of nut 57 on bolt 52, the height of clamping plates 55 and 56 and hence the height of curtain assembly 10 may be adjusted. Thus, as the ends of cord member 12 wear upon use in heat treating furnace 11 (FIG. 3), curtain assembly 10 may be lowered to enable the effective life thereof to be increased. In practice, curtain assembly 10 will occupy substantially the full width of channel 50 and thereby provide a gas seal. That is, curtain assembly 10 should not be lowered to enable the unobstructed passage of gas thereabove from one side of channel 50 to the other.

It will be understood that as the length of channel 50 and mounting plates 55 and 56 is substantially coextensive with the width of curtain assembly 10, two or more sets comprised of bolts 52 and nuts 57 may be required to adequately support curtain assembly 10. However, replacement of a worn curtain assembly 10 may be easily achieved by releasing nut 57 and removing assembly 10 from mounting plates 55 and 56. In addition, several channels 50, each with an accompanying curtain assembly 10, may be provided with box 49 to assure that box 49 substantially precludes gas flows therethrough; i.e. blocks the flow of gaseous atmosphere from furnace 11 (FIG. 3) outwardly of box 49 and inhibits the inward flow of ambient atmosphere into furnace 11. In addition, an inert gas such as nitrogen may be introduced into box 49 to inert the same and assist curtain assembly 10 in blocking the inward flow of ambient atmosphere as mentioned above.

In summary, curtain assemblies according to the present invention constitute an improvement over prior art curtain devices in that curtain sections may be handled and stored independently of the mounting hardware required therefor. This desirable result is achieved by wrapping heat-resistant cord material with a tape-like member and adhesively securing these materials together which in turn significantly reduces the tendency of individual cord members to loosen between clamping plates. In addition, by disposing clamping plates in contact with the elongate tape member, the tendency of bolts extending through the curtain assembly to cut individual cord members is also substantially reduced. Furthermore, by mounting the curtain assembly such that the same is vertically adjustable in a furnace, etc., the curtain assembly may be lowered as ends of the cord material wear. The foregoing attributes of the present invention all cooperate to extend the effective life of such cord members which are usually relatively expensive.

The foregoing and other various changes in form and details may be made without departing from the spirit and scope of the present invention. Consequently, it is intended that the appended claims be interpreted as including all such changes and modifications.

We claim:

1. A curtain assembly for substantially blocking gas flows comprising a plurality of cord members comprised of heat resistant material, elongate tape means wrapped about said cord members at approximately the mid-point thereof to form a pair of curtain sections each comprised of said cord members, means for securing said tape means to said cord members to form said curtain sections as substantially free hanging and which may be stored independently of means for mounting said curtain assembly in a furnace or the like.

2. The curtain assembly defined in claim 1 further comprising clamping means releasably secured to said elongate tape means and means for supporting said clamping means such that said curtain sections hang substantially vertically.

3. The curtain assembly defined in claim 2 wherein said clamping means comprise first and second mounting plates disposed above and below said tape means, respectively and means extending through said mounting plates and tape means for releasably securing said curtain assembly to said mounting plates.

4. The curtain assembly defined in claim 2 additionally comprising supporting means for adjustably varying the height of said curtain assembly.

5. The curtain assembly defined in claim 3 wherein said assembly is disposed in said furnace having a roof section with said adjusting means being disposed so as to enable the vertical position of said curtain assembly in said furnace to be adjusted.

6. The curtain assembly defined in claim 1 wherein said tape means comprise a first portion longer than the width of said curtain assembly with the ends of said first portion folded over a portion of said cord members and a second portion extending approximately between the ends of said first portion of said tape means.

7. The curtain assembly defined in claim 1 wherein said means for securing said tape means to said cords comprise a silicone based heat curable and heat resistant adhesive material.

8. The curtain assembly defined in claim 7 wherein said adhesive material is disposed in two substantially linear beads along the length of said elongate tape means such that upon curing, said adhesive material bonds said cord members to each other and to said tape means.

9. The curtain assembly defined in claim 1 wherein said curtain sections are comprised of at least two layers of said cord members.

10. The curtain assembly defined in claim 9 wherein said adhesive material is comprised of a silicone based heat resistant adhesive and is applied to each of said layers of said cord material.

* * * * *